United States Patent
Kim et al.

(10) Patent No.: US 7,877,636 B2
(45) Date of Patent: Jan. 25, 2011

(54) SYSTEM AND METHOD FOR DETECTING TEMPORAL RELATIONSHIPS UNIQUELY ASSOCIATED WITH AN UNDERLYING ROOT CAUSE

(75) Inventors: Kyusung Kim, Plymouth, MN (US); Robert C. McCroskey, Burnsville, MN (US); Paul Frederick Dietrich, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 241 days.

(21) Appl. No.: 12/200,685

(22) Filed: Aug. 28, 2008

(65) Prior Publication Data

US 2010/0058112 A1 Mar. 4, 2010

(51) Int. Cl.
G06F 11/00 (2006.01)
(52) U.S. Cl. .............. 714/26; 714/25; 714/30; 714/31; 714/48
(58) Field of Classification Search ............. 714/25, 714/26, 30, 31, 48
See application file for complete search history.

(56) References Cited

U.S. PATENT DOCUMENTS

| | | | |
|---|---|---|---|
| 4,414,539 A | 11/1983 | Armer | |
| 5,184,312 A | 2/1993 | Ellis | |
| 5,937,366 A | 8/1999 | Zbytniewski et al. | |
| 6,415,395 B1 | 7/2002 | Varma et al. | |
| 6,629,106 B1 | 9/2003 | Narayanaswamy et al. | |
| 6,643,798 B2 * | 11/2003 | Barton et al. | 714/25 |
| 7,076,695 B2 * | 7/2006 | McGee et al. | 714/47 |
| 7,203,879 B2 | 4/2007 | Shabib et al. | |
| 7,350,107 B2 * | 3/2008 | Thaler et al. | 714/26 |
| 7,509,234 B2 * | 3/2009 | Unnikrishnan et al. | 702/183 |
| 2004/0230868 A1 * | 11/2004 | Sabet et al. | 714/25 |
| 2005/0080806 A1 | 4/2005 | Doganata et al. | |
| 2006/0123278 A1 * | 6/2006 | Dini et al. | 714/712 |
| 2006/0248389 A1 * | 11/2006 | Thaler et al. | 714/26 |
| 2007/0266142 A1 | 11/2007 | Nastacio | |
| 2008/0016412 A1 * | 1/2008 | White et al. | 714/48 |
| 2009/0049338 A1 * | 2/2009 | Unnikrishnan et al. | 714/26 |
| 2009/0312897 A1 * | 12/2009 | Jamrosz et al. | 701/29 |

OTHER PUBLICATIONS

EP Search Report, EP 09168416.7-1225 dated Sep. 9, 2010.

* cited by examiner

*Primary Examiner*—Robert Beausoliel
*Assistant Examiner*—Charles Ehne
(74) *Attorney, Agent, or Firm*—Ingrassia Fisher & Lorenz, P.C.

(57) ABSTRACT

Methods and systems are provided for detecting temporal relationships that are uniquely associated with a selected root cause. The method comprises identifying error codes associated with a root cause, wherein each error code comprises a plurality of event indicators and temporal data describing when the event indicator was generated, analyzing each of the error codes to detect a combination of event indicators that is associated with error codes corresponding to the selected root cause and to a non-selected root cause, and detecting a temporal relationship involving the combination of event indicators, wherein the temporal relationship is uniquely associated with error codes corresponding to the selected root cause.

18 Claims, 6 Drawing Sheets

| ERROR CODE | PART NO. | SERIAL NO. | MODULE REMOVAL TIME |
|---|---|---|---|
| A-(2002-2-14 2:46:12), B-(2002-3-10 9:45:52), A-(2002-3-27 16:14:10), B-(2002-4-15 21:15:15), A-(2002-5-30 10:45:10), B-(2002-5-30 10:45:15), D-(2002-5-30 15:45:23), C-(2002-5-30 15:45:55), E-(2002-5-30 15:49:38) | M1 | S1 | 2002-6-5 11:50:55 |
| D-(2002-4-12 20:23:02), E-(2002-4-12 20:23:05) | M1 | S24 | 2002-5-5 15:30:12 |
| B-(2003-5-29 15:34:12), G-(2003-5-29 15:34:17), W-(2003-5-29 15:34:23), B-(2003-9-15 12:33:22), G-(2003-9-15 12:33:51), W-(2003-9-15 12:34:15), B-(2003-10-27 15:03:21), G-(2003-10-27 15:20:317), W-(2003-10-27 12:31:43) | M1 | S2 | 2003-10-30 12:29:12 |
| N-(2003-8-20 12:34:46), U-(2003-8-20 12:35:13), X-(2003-8-20 12:35:57), R-(2003-8-23 14:52:26) | M1 | S84 | 2003-10-25 12:00:32 |
| T-(2003-11-23 08:22:44), C-(2003-11-23 08:23:14), R-(2003-11-23 08:23:25) | M1 | S71 | 2003-12-21 10:23:45 |
| N-(2002-7-25 14:49:22), U-(2002-9-05 4:12:23), X-(2002-12-10 18:37:15), A-(2003-4-21 10:12:19), A-(2003-4-21 12:31:14), A-(2003-5-15 06:43:56), D-(2003-5-15 11:41:02), C-(2003-5-15 11:44:12) | M1 | S3 | 2003-5-20 15:45:35 |
| B-(2003-5-29 21:17:45), G-(2003-5-29 21:18:45), W-(2003-5-29 21:19:05), E-(2003-6-04 12:26:50), B-(2003-7-12 8:17:28), G-(2003-7-12 8:17:57), W-(2003-7-12 8:18:23 ), B-(2003-8-05 15:25:12), G-(2003-8-05 15:34:58), W-(2003-8-05 15:35:23) | M1 | S4 | 2003-8-28 10:13:25 |
| D-(2004-1-05 11:45:23), A-(2004-1-05 11:45:26), B-(2004-7-15 11:45:50), G-(2004-7-15 11:46:15), W-(2004-7-15 11:46:45), C-(2004-7-27 12:56:21) | M1 | S5 | 2005-8-05 15:56:23 |
| K-(2003-12-29 8:00:13), N-(2004-2-21 9:58:34), U-(2004-2-21 9:58:54), X-(2004-2-21 9:59:21) | M1 | S92 | 2004-11-26 10:23:14 |
| A-(2003-11-15 14:12:26), J-(2004-1-12 9:41:28), A-(2004-2-03 17:15:53), A-(2004-2-15 19:40:01), B-(2004-2-15 19:40:17), D-(2004-2-15 24:40:26), J-(2004-2-15 24:40:45), C-(2004-2-15 24:40:58) | M1 | S6 | 2004-2-19 10:35:23 |
| T-(2004-5-27 02:23:24), R-(2004-5-28 10:43:12) | M1 | S7 | 2005-7-13 19:46:23 |
| A-(2004-2-12 16:15:12), K-(2004-3-14 13:43:45), A-(2004-3-14 13:43:45), A-(2004-5-30 12:45:30). | M1 | S8 | 2004-6-5 12:34:23 |
| D-(2004-5-30 17:45:50), C-(2004-5-30 17:46:10), K-(2004-5-30 17:46:10) | M1 | S98 | 2004-4-21 22:14:45 |
| N-(2004-2-14 18:56:13), U-(2004-2-14 18:56:27), X-(2004-2-14 18:57:05), L-(2004-2-23 17:25:42) | M1 | S98 | 2004-4-21 22:14:45 |
| D-(2003-10-19 08:23:25), A-(2003-10-19 08:23:56), C-(2003-11-23 08:24:57), R-(2003-11-23 08:22:44), T-(2003-11-23 08:23:14) | M1 | S9 | 2003-12-22 16:17:45 |
| W-(2004-9-12 09:13:05), Z-(2004-9-12 09:13:43) | M1 | S10 | 2004-11-01 10:00:34 |
| B-(2003-4-19 16:12:21), G-(2003-4-19 16:57:11), W-(2003-4-19 17:34:43) C-(2004-5-29 16:24:05), B-(2004-8-29 20:21:11), G-(2004-8-29 20:55:34), W-(2004-8-29 21:37:23) | M1 | S12 | 2004-11-22 8:09:15 |

FIG. 2

| ROOT CAUSE | PART NO. | SERIAL NO. | ROOT CAUSE TIME |
|---|---|---|---|
| CAPACITOR FAILURE | M1 | S1 | 2002-9-30 10:45:15 |
| POWER SUPPLY FAILURE | M1 | S2 | 2004-1-20 3:45:53 |
| CAPACITOR FAILURE | M1 | S3 | 2003-11-28 9:45:12 |
| POWER SUPPLY FAILURE | M1 | S71 | 2003-12-10 11:45:12 |
| RESISTOR FAILURE | M1 | S84 | 2004-2-25 22:14:45 |
| POWER SUPPLY FAILURE | M1 | S4 | 2004-3-14 15:00:46 |
| NO FAULT FOUND | M1 | S5 | 2005-11-12 9:32:32 |
| NO FAULT FOUND | M1 | S50 | 2004-4-22 13:45:54 |
| CAPACITOR FAILURE | M1 | S6 | 2004-5-10 14:42:23 |
| RESISTOR FAILURE | M1 | S92 | 2004-7-12 16:01:32 |
| NO FAULT FOUND | M1 | S7 | 2005-10-28 11:41:23 |
| NO FAULT FOUND | M1 | S2 | 2006-10-23 12:05:30 |
| CAPACITOR FAILURE | M1 | S51 | 2004-9-20 9:50:24 |
| CAPACITOR FAILURE | M1 | S8 | 2004-10-3 13:12:48 |
| POWER SUPPLY FAILURE | M1 | S9 | 2004-3-12 10:13:15 |
| RESISTOR FAILURE | M1 | S98 | 2004-6-18 10:23:14 |
| NO FAULT FOUND | M1 | S60 | 2004-11-7 13:56:12 |
| CAPACITOR FAILURE | M1 | S11 | 2004-12-20 11:37:12 |
| POWER SUPPLY FAILURE | M1 | S12 | 2005-1-5 9:30:23 |

FIG. 3

| ROOT CAUSE | ERROR CODE | MODULE REMOVAL TIME |
|---|---|---|
| CAPACITOR FAILURE | A-(2002-2-14 2:46:12), B-(2002-3-10 9:45:52), A-(2002-3-27 16:14:10), B-(2002-4-15 21:15:15), A-(2002-5-30 10:45:10), B-(2002-5-30 10:45:15), D-(2002-5-30 15:45:23), C-(2002-5-30 15:45:55), E-(2002-5-30 15:49:38) | 2002-6-5 11:50:55 |
| CAPACITOR FAILURE | N-(2002-7-25 14:49:22), U-(2002-9-05 4:12:23), X-(2002-12-10 18:37:15), A-(2003-4-21 10:12:19), A-(2003-4-21 12:31:14), A-(2003-5-15 06:43:56), D-(2003-5-15 11:41:02), C-(2003-5-15 11:44:12) | 2003-5-20 15:45:35 |
| CAPACITOR FAILURE | A-(2003-11-15 14:12:26), J-(2004-1-12 9:41:28), A-(2004-2-03 17:15:53), A-(2004-2-15 19:40:t01), B-(2004-2-15 19:40:17), D-(2004-2-15 24:40:26), J-(2004-2-15 24:40:45), C-(2004-2-15 24:40:58) | 2004-2-19 10:35:23 |
| CAPACITOR FAILURE | A-(2004-2-12 16:15:12), K-(2004-3-14 13:43:45), A-(2004-3-27 23:54:05), A-(2004-5-30 12:45:30), D-(2004-5-30 17:45:50), C-(2004-5-30 17:46:10), K-(2004-5-30 17:46:10) | 2004-6-5 12:34:23 |
| RESISTOR FAILURE | N-(2003-8-20 12:34:46), U-(2003-8-20 12:35:13), X-(2003-8-20 12:35:57), R-(2003-8-23 14:52:26) | 2003-10-25 12:00:32 |
| RESISTOR FAILURE | K-(2003-12-29 8:00:13), N-(2004-2-21 9:58:34), U-(2004-2-21 9:58:54), X-(2004-2-21 9:59:21) | 2004-11-26 10:23:14 |
| RESISTOR FAILURE | N-(2004-2-14 18:56:13), U-(2004-2-14 18:56:27), X-(2004-2-14 18:57:05), L-(2004-2-23 17:25:42) | 2004-4-21 22:14:45 |
| POWER SUPPLY FAILURE | B-(2003-5-29 15:34:12), G-(2003-5-29 15:34:17), W-(2003-5-29 15:34:23), B-(2003-9-15 12:33:22), G-(2003-9-15 12:33:51), W-(2003-9-15 12:34:15), B-(2003-10-27 15:03:21), G-(2003-10-27 15:20:317), W-(2003-10-27 12:31:43) | 2003-10-30 12:29:12 |
| POWER SUPPLY FAILURE | T-(2003-11-23 08:22:44), C-(2003-11-23 08:23:14), R-(2003-11-23 08:23:25) | 2003-12-21 10:23:45 |
| POWER SUPPLY FAILURE | B-(2003-5-29 21:17:45), G-(2003-5-29 21:18:45), W-(2003-5-29 21:19:05), E-(2003-6-04 12:26:50), B-(2003-7-12 8:17:28), G-(2003-7-12 8:17:57), W-(2003-7-12 8:18:23 ), B-(2003-8-05 15:25:12), G-(2003-8-05 15:34:58), W-(2003-8-05 15:35:23) | 2003-8-28 10:13:25 |
| POWER SUPPLY FAILURE | D-(2003-10-19 08:23:25), A-(2003-10-19 08:23:56), C-(2003-11-23 08:24:57), R-(2003-11-23 08:22:44), T-(2003-11-23 08:23:14) | 2003-12-22 16:17:45 |
| POWER SUPPLY FAILURE | B-(2003-4-19 16:12:21), G-(2003-4-19 16:57:t1l), W-(2003-4-19 17:34:43) C-(2004-5-29 16:24:05), B-(2004-8-29 20:21:t1l), G-(2004-8-29 20:55:34), W-(2004-8-29 21:37:23) | 2004-11-22 8:09:15 |
| NO FAULT FOUND | D-(2004-1-05 11:45:23), A-(2004-1-05 11:45:26), B-(2004-7-15 11:45:50), G-(2004-7-15 11:46:15), W-(2004-7-15 11:46:45), C-(2004-7-27 12:56:21) | 2005-8-05 15:56:23 |
| NO FAULT FOUND | T-(2004-5-27 02:23:24), R-(2004-5-28 10:43:12) | 2005-7-13 19:46:23 |

FIG. 5

SYSTEM AND METHOD FOR DETECTING TEMPORAL RELATIONSHIPS UNIQUELY ASSOCIATED WITH AN UNDERLYING ROOT CAUSE

TECHNICAL FIELD

The present invention generally relates to diagnostics for an electronic system, and more particularly relates to a system and method for detecting temporal relationships that are uniquely associated with an underlying root cause.

BACKGROUND

Electronic systems, such as those used in aircraft, provide little warning before the occurrence of an operational issue. Further, unlike mechanical systems, the various components of an electronic system cannot be checked for wear and tear to determine when they should be removed or replaced. Thus, electronic systems are often subject to unscheduled maintenance which can result in higher costs of operation. With adequate warning of a potential operational issue or maintenance need, the costs associated with maintaining an electronic system can be reduced.

Many electronic systems use Built-in-Test to help diagnose the cause of an operational issue and take preventative actions. Built-in-Test comprises a series of tests that the electronic system can perform to determine whether it is functioning properly. One common issue with Built-in-Test is a high rate of false alarms. A false alarm occurs when one or more negative Built-in-Test results are generated and no operational issue with the electronic system is discovered. In addition, with highly integrated electronic systems, a single operational issue can lead to many negative Built-in-Test results. For example, a system bus that is not functioning properly may cause one or more negative test results in the various systems which are connected to it. Therefore, a single set of Built-in-Test results may include many negative Built-in-Test results that are unrelated to the operational state of the electronic system (e.g., because they are caused by false alarms or problems that are not related to the electronic system) making it difficult to identify those Built-in-Test results that are associated with an operational issue for an electronic system.

Accordingly, it is desirable to provide a system and method for analyzing multiple Built-in-Test error codes that are associated with electronic systems having operational issues with a known root cause to identify temporal relationships of Built-in-Test results that are indicative of that root cause. Furthermore, other desirable features and characteristics of the present invention will become apparent from the subsequent detailed description of the invention and the appended claims, taken in conjunction with the accompanying drawings and this background of the invention.

BRIEF SUMMARY

Methods and systems are provided for detecting temporal relationships that are uniquely associated with a selected root cause. The method comprises identifying error codes associated with a root cause, wherein each error code comprises a plurality of event indicators and temporal data describing when the event indicator was generated, analyzing each of the error codes to detect a combination of event indicators that is associated with error codes corresponding to the selected root cause and to a non-selected root cause, and detecting a temporal relationship involving the combination of event indicators, wherein the temporal relationship is uniquely associated with error codes corresponding to the selected root cause.

BRIEF DESCRIPTION OF THE DRAWINGS

The present invention will hereinafter be described in conjunction with the following drawing figures, wherein like numerals denote like elements.

FIG. 2 is a table representing an exemplary error code database;

FIG. 3 is a table representing an exemplary root cause database;

FIG. 5 is a table representing an exemplary error code/root cause database.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
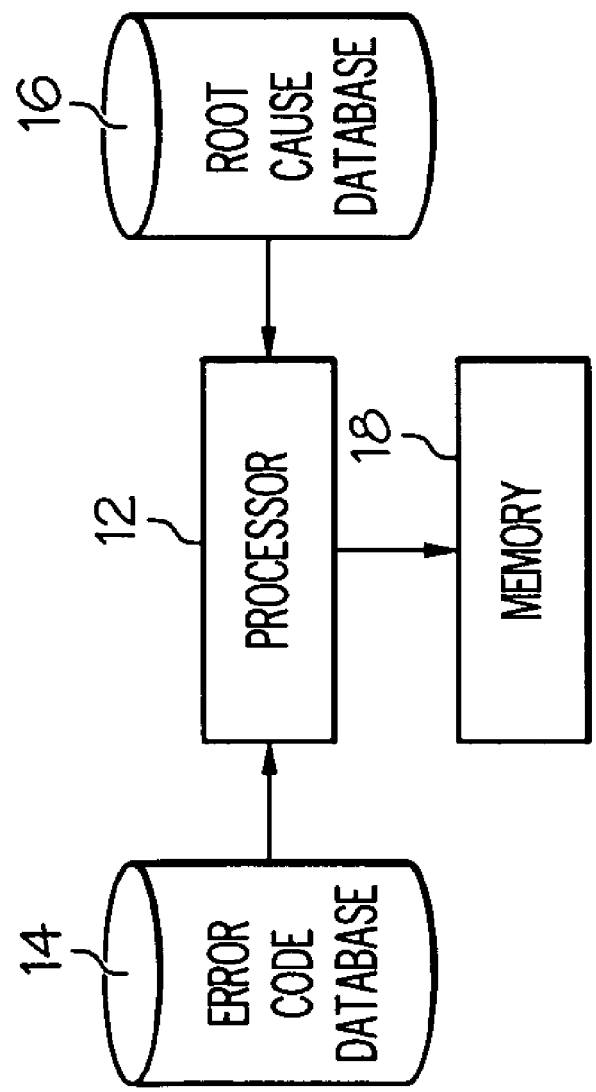
FIG. 1 is a block diagram of an exemplary diagnostic system for detecting temporal relationships that correspond to a root cause of an operational issue with an electronic system.

FIG. 1 is a block diagram of an exemplary system 10 for detecting temporal relationship of event indicators that are uniquely associated with a root cause of an operational issue with an electronic system. The system 10 comprises a processor 12, an error code database 14, a root cause database 16, and electronic memory 18.

The error code database 14 aggregates error codes that are generated by a plurality of electronic systems. As used herein, the term "error code" refers to a collection of one or more event indicators and the term "event indicator" refers to any symbol that conveys information regarding an operational state of an electronic system. Error codes may be generated by any electronic system that is capable of generating data regarding its operational state.

In one embodiment, the electronic system is configured for use on an aircraft and uses Built-in-Testing to determine its operational state. For example, the electronic system may be a Line Replaceable Unit (LRU) that executes a plurality of Built-in-Tests. In this case, each test that is performed by the LRU is associated with a different symbol or event indicator (e.g., "A", "B", "C", etc.) and an error code comprising event indicators A, B, D indicates that the LRU received negative results for the Built-in-Test identified with those symbols. Each event indicator that is generated by an LRU is stored, along with temporal data describing the time that it was generated, in an electronic memory on the LRU. When the presence of an operational issue with a particular LRU is detected, a technician or other maintenance personnel retrieves the event indicators and temporal data that were generated by the LRU during a predetermined period of time from the electronic memory. These event indicators and temporal data are stored as error codes in the error code database 14 along with information describing the electronic system and a timestamp describing when they were retrieved from the LRU.

FIG. 2 is a depiction of a table representing an exemplary error code database 200. The error code database 200 comprises a plurality of error codes 202, module identifiers 204, and module removal time 206. Each error code 202 was generated by an electronic system (e.g., an LRU as described above) and includes at least one event indicator. In addition, each event indicator is associated with temporal data describing the time when it was generated. In the illustrated embodiment, the temporal data is a timestamp showing the date and time that the corresponding event indicator was generated. However, it should be noted that other types of temporal data may also be utilized.

The module identifiers 204 uniquely identify the electronic system that generated the corresponding error code 202. In the illustrated embodiment, each module identifier 204 comprises both a part number and a serial number. It will be appreciated, however, that the module identifiers 204 may include any information that uniquely identifies an electronic system. Finally, the module removal time 206 identifies the date and time that the presence of an operational issue is detected and the electronic system is removed from its operational environment. The module removal time 206 serves as a timestamp for each corresponding error code 202.

Returning to FIG. 1, the root cause database 16 includes a plurality of root causes that correspond to the operational issues for many of the electronic systems described in the error code database 14. As used herein, the term "root cause" refers to a general description of the primary failure modes for an electronic system. The root causes are not specific descriptions of the cause of an operational failure of an electronic system, but rather broad descriptions into which one or more specific failures may be categorized. For example, if an electronic system fails because one or more of its capacitors is faulty, the root cause for that failure might be "Capacitor Failure" without regard for the identity of the faulty capacitor or the nature of its operational failure. Other possible root causes include "Resistor Failure" to identify instances in which the electronic system fails due to a fault in one or more of its resistors, "Power Supply Failure" to identify instances in which an electronic system fails due to a fault in its power supply, and "No Fault Found" to identify instances in which an electronic system generates an error code, but no operational issue is discovered. It should be noted that an electronic system may have many root causes that are different from and/or in addition to those described above.

After a potential operational issue with an electronic system is discovered and the error code is retrieved, as described above, from the error code database 14, the electronic system may be removed from its operational environment and subject to various diagnostic procedures to determine the cause of the operational issue. The cause of the operational issue is then classified as one of a plurality of root causes and stored in the root cause database 16 along with information describing the electronic system. For example, when a potential operational issue with an LRU on an aircraft is discovered, the LRU will be removed and sent to a repair facility. At the repair facility the LRU is analyzed to determine the cause of the operational issue. This cause is categorized as a root cause and stored in the root cause database 16 along with information describing the LRU. Thus, many of the electronic systems in the root cause database 16 are the same as the electronic systems described in the error code database 14.

FIG. 3 is a depiction of a table representing an exemplary root cause database 210. As depicted, the root cause database 210 comprises a plurality of root causes 212, module identifiers 214, and root cause timestamps 216. As described above, the root causes 212 are a general description of the cause of an operational issue with an electronic system. The module identifiers 214 correspond to the electronic system. The root cause timestamps 216 represent the time describing when the electronic system arrived at a repair facility or when the operational issue with the electronic system was diagnosed.

Returning to FIG. 1, the processor 12 may comprise one or more microprocessors or any other type of processing unit that is known by one who is skilled in the art. As further described below, the processor 12 receives data from the error code database 14 and the root cause database 16 and associates error codes from the error code database 14 with their corresponding root causes from the root cause database 16. Processor 12 then analyzes the associated error codes, root causes, and error code timestamps to detect temporal relationships that are uniquely associated with a single root cause. Finally, processor 12 stores these combinations and temporal relationships in memory 18.

Figure 4:
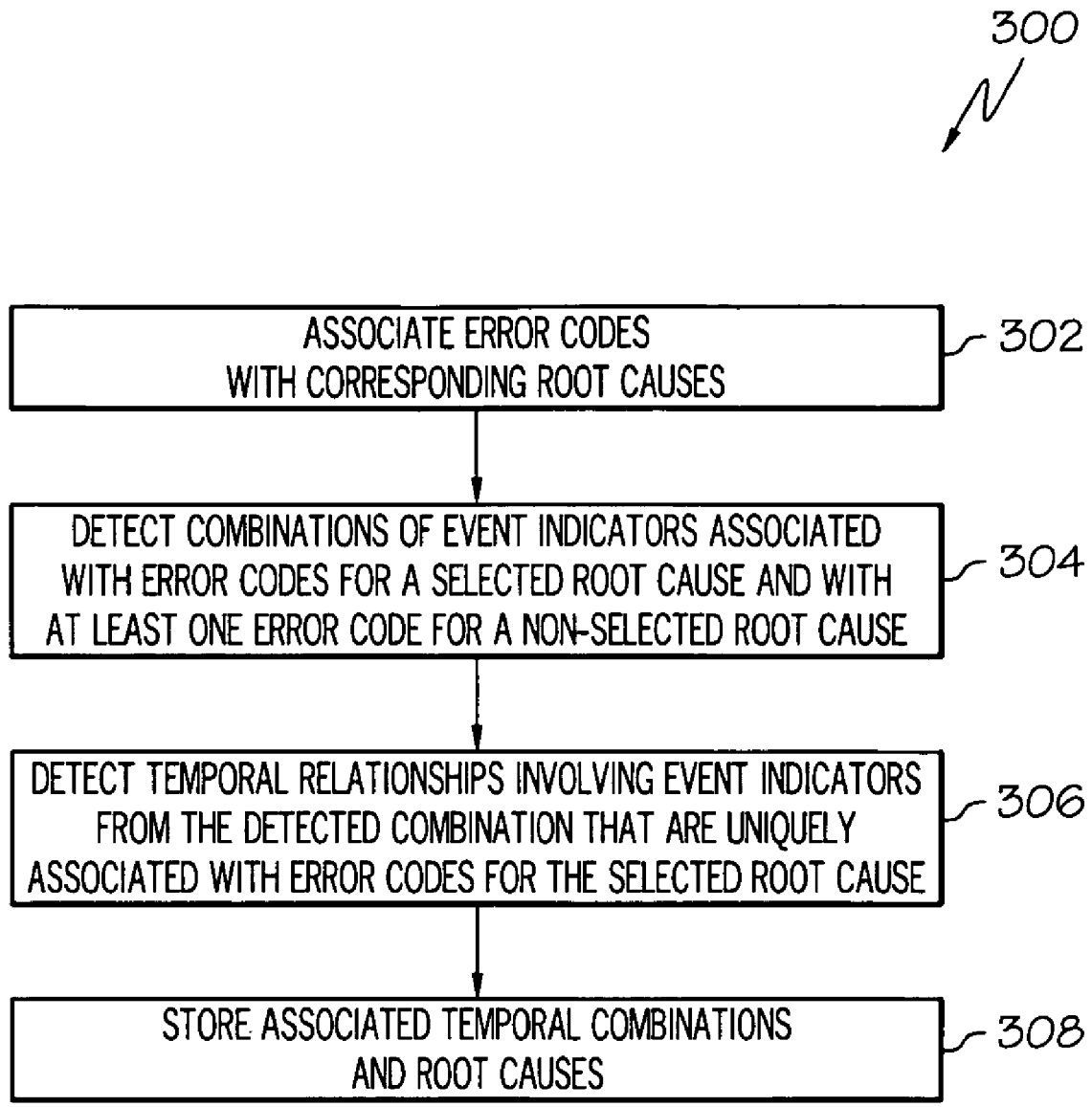
FIG. 4 is a flowchart of an exemplary method for detecting temporal relationships that are uniquely associated with a root cause.

FIG. 4 depicts a flowchart of an exemplary method 300 for detecting temporal relationships that are uniquely associated with a root cause. Method 300 begins with step 302 when the error codes from the error code database 14 (FIG. 1) are associated with corresponding root causes from the root cause database 16 (FIG. 1). FIG. 5 depicts a table representing an exemplary error code/root cause database 400 for associating a plurality of root causes 422 with a plurality of error codes 424. The error code/root cause database 400 also includes the module removal times 425 associated with the error codes 424. With reference to FIGS. 2, 3, and 5, the error code/root cause database 400 is generated by comparing the module identifier 204 for each error code 202 in the error code database 200 to the module identifier 214 for each root cause 212 in the root cause database 210. If a match is identified, the corresponding error code 202, root cause 212, and module removal time 206 are associated in the error code/root cause database 400.

For example, during step 302 (FIG. 4) a processor (e.g., the processor 12 of FIG. 1) identifies the first module identifier M1:S1 (e.g., Part No: M1 and Serial No. S1) that corresponds to error code "A, B, A, B, A, B, D, C, E" in the error code database 200 and searches for the same module identifier in the root cause database 210. The processor determines that M1:S1 corresponds to root cause "Capacitor Failure" in the root cause database 210 and associates error code "A, B, A, B, A, B, D, C, E" and its module removal time 206 (e.g., 2002-6-5 11:50:55) with root cause "Capacitor Failure." In some embodiments, the processor may also determine whether the difference between the module removal time 206 (e.g., 2002-6-5 11:50:55) and the root cause timestamp 216 (e.g., 2002-9-30 10:45:15) for the corresponding root cause "Capacitor Failure" exceeds a predetermined threshold (e.g., one year). If the difference between the two times is equal to or greater than the predetermined threshold then the error code and root cause are not associated with one another because they are too distant in time and are most likely unrelated. On the other hand, if the difference between the two times is less than the predetermined threshold, the processor stores the associated error code 424, module removal time 425, and root cause 422 in the error code/root cause database 400.

Next, the processor identifies module identifier M1:S24 that corresponds to error code "D, E" in the error code database 200 and searches for that module identifier in the root cause database 210. In this case, M1:S24 is not found in the root cause database 210. Thus, the processor does not store the error code "D, E" in the error code/root cause database 400.

The processor then identifies the next module identifier M1:S2 that corresponds to error code "B, G, W, B, G, W, B, G, W" in the error code database 200 and searches for that module identifier in the root cause database 210. As shown, M1:S2 corresponds to two root cause candidates "Power Supply Failure" and "No Fault Found" in the root cause database 210. The processor compares the module removal time 206 for error code "B, G, W, B, G, W, B, G, W" (e.g., 2003-10-30 12:29:12) to the root cause timestamps 216 for both root cause candidates to determine which is closer. In this case, the root cause timestamp 216 for the root cause "Power Supply Failure" (e.g., 2004-1-20 3:45:53) is closer and the processor associates the error code "B, G, W, B, G, W, B, G, W" and its module removal time 206 with the root cause "Power Supply Failure" in the error code/root cause database 400. This process continues until each associated error code 202 and root cause 212 have been detected and stored in the error code/root cause database 400.

Referring now to FIGS. 4 and 5, during step 304 of method 300, the processor detects combinations of event indicators that are associated with error codes corresponding to a selected root cause and with at least one error code corresponding to a non-selected root cause. The selected root cause may be any root cause 422 that appears in the error code/root cause database 400. The strength of an association between a combination of event indicators and a selected root cause may be expressed as a percentage representing how often that combination of event indicators is found in error codes for the selected root cause (hereinafter referred to as the "detection rate").

To detect these combinations of event indicators, the processor isolates the error codes 424 that are associated with the selected root cause 422 in the error code/root cause database 400. For example, in the illustrated embodiment the error code/root cause database 400 is sorted with respect to the root cause 422. Consequently, the error codes 424 for the root cause "Capacitor Failure" are shown in a first group 426, the error codes 424 for the root cause "Resistor Failure" are shown in group 427, the error codes 424 for the root cause "Power Supply Failure" are shown in a second group 428, and error codes 424 for the root cause "No Fault Found" are shown in a fourth group 430. During step 304, the processor first analyzes the error codes that correspond to the selected root cause (e.g., the error codes in one of groups 426, 427, 428, or 430) to detect combinations of event indicators that are associated with those error codes. The processor then analyzes the remaining error codes to determine if they include the detected combinations of event indicators.

For example, if the selected root cause is "Capacitor Failure," the processor analyzes the error codes for group 426 (e.g., corresponding to "Capacitor Failure") and determines that combination of event indicators A, C, and D is associated with those error codes with a detection rate of 100%. In addition, the processor analyzes the remaining error codes (e.g., the error codes 424 in groups 427, 428, and 430) and determines that the error codes in rows 450 and 452 (corresponding to "Power Supply Failure" and "No Fault Found," respectively) also include combination of event indicators A, C, and D.

Alternatively, if the selected root cause is "Resistor Failure," the processor analyzes the error codes for group 427 (e.g., corresponding to "Resistor Failure") and determines that the combination of event indicators N, U, and X is associated with those error codes with a detection rate of 100%. The processor then analyzes the remaining error codes (e.g, the error codes 424 in groups 426, 428, and 430) and determines that the error code 424 in row 456 (corresponding to "Capacitor Failure") also includes the combination of event indicators N, U, and X.

Alternatively still, if the selected root cause is "Power Supply Failure," the processor analyzes the error codes for group 428 (e.g., corresponding to "Power Supply Failure") and determines that combination of event indicators T and R is associated with those error codes 424 with a detection rate of 40% and the combination of event indicators B, G, and W is associated with those error codes 424 with a detection rate of 60%. Next, the processor analyzes the remaining error codes 424 (e.g., the error codes in groups 426, 427, and 430) and determines that the combination of event indicators T and R also occurs in the error code 424 for row 458 (corresponding to "No Fault Found") and the combination of event indicators B, G, and W occurs in the error code 424 in row 452 (corresponding to "No Fault Found").

Next, during step 306 the processor determines if there is a temporal relationship involving the event indicators in the combination detected during step 304 that is uniquely associated with the error codes 424 that correspond to the selected root cause. The temporal relationship may be any relationship involving the temporal data associated with one or more of the event indicators in the detected combination that is uniquely associated with the error codes 424 for the selected root cause. For example, the temporal relationship may comprise a sequence (contiguous or non-contiguous) of the event indicators that is unique to the error codes 424 for the selected root cause. In addition, the temporal relationship may include a sequence (contiguous or non-contiguous) of event indicators that occurs within a set time period or repeats a set number of times and is unique to the error codes 424 for a selected root cause. The temporal relationship may also comprise a set time period between the module removal time 425 and at least one event of the event indicators from a sequence or combination.

For example, if the selected root cause is "Capacitor Failure," the processor analyzes the error codes for the first group 426 and detects, based on the temporal data for each event indicator, that event indicators A, C, and D always appear in a non-contiguous sequence (e.g., A first, D second, and C third with other event indicators occurring in between them). Further, in rows 450 and 452 event indicators A, C, and D appear in a different order (e.g., D first, A second, and C third). Thus, the sequence of event indicators A, D, and then C is uniquely associated with the error codes for root cause "Capacitor Failure" with a 100% detection rate.

Alternatively, if the selected root cause is "Resistor Failure," the processor analyzes the error codes 424 for the second group 427 and detects, based on the temporal data for each event indicator, that the combination of event indicators N, U, and X always occurs in the contiguous sequence N followed by U followed by X with no intervening event indicators and that this sequence is generated in less than one minute. Further, while the error code in row 456 includes the sequence N, U, and X, the sequence is not generated in less than one minute. Thus, error codes associated with root cause "Resistor Failure" are uniquely associated with the sequence of event indicators N→U→X that is generated in less than one minute with a 100% detection rate.

Alternatively still, if the selected root cause is "Power Supply Failure," the processor analyzes the error codes 424 for the third group 428 and detects based on the temporal data for each event indicator that event indicators T and R do not occur in a consistent order or sequence in those error codes. However, in this case the module removal times 425 associated with each error code 424 in group 428 that includes event indicators T and R, occur within one month of the time that error code T or R was first generated. Thus, there is a lag of no more than one month between the time that event indicators T or R are generated and the detection of an operational issue on an electronic system. The module removal time 425 in row 458 occurs more than one year following the generation of event indicators T or R. Thus, error codes associated with root cause "Power Supply Failure" are uniquely associated with event indicators T and R with a 40% detection rate, wherein the module removal time 425 associated with each error code occurs within one month of the first time that event indicators T or R were generated.

In addition, when the selected root cause is "Power Supply Failure," the processor detects that event indicators B, G, and W occur in a contiguous sequence B, G, and W that is repeated at least two times. In row 452 the sequence B, G, and W is not repeated at least two times. Therefore, error codes associated with root cause "Power Supply Failure" are uniquely associated with a sequence B, G, and W of event indicators that is repeated at least twice.

During step 308, the processor associates the temporal relationships that were identified in step 306 with their corresponding root causes in memory (e.g., the memory 18 of FIG. 1).

While examples of temporal relationships are provided above, it should be noted that any temporal relationship that involves the temporal data for one or more of the event indicators in the combination detected during step 304 and is uniquely associated with the selected root cause may be identified during step 306. In addition, it should be noted that while each of the temporal relationships described above have the same detection rate as the corresponding combination detected during step 304, it is possible for the temporal relationship to have a lower detection rate than its corresponding detected combination (e.g., where the temporal relationship occurs in a fewer number of error codes 424 for the selected root cause than its corresponding combination).

Figure 6:
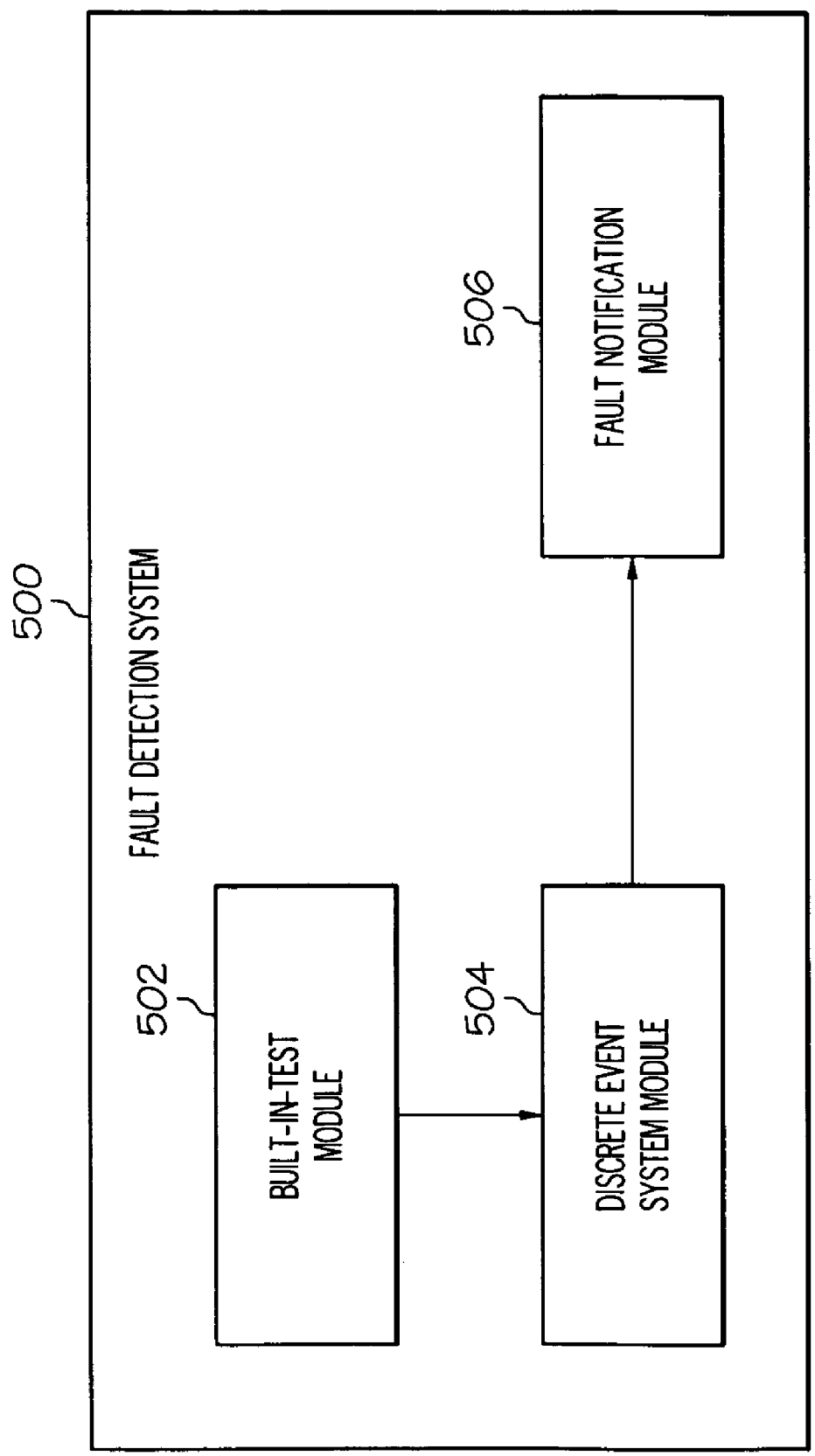
FIG. 6 is a schematic view of a fault detection method that uses temporal relationships detected during the method of FIG. 4.

One or more of the temporal relationships identified during method 300 may be combined with a fault detection system to detect potential operational issues for an electronic system. FIG. 6 is a schematic view of a fault detection system 500 that may use some of the temporal relationships identified during method 300. The fault detection system 500 may be coupled to or integrally formed with the electronic system. In the depicted embodiment, the fault detection system 500 includes a Built-in-Test module 502, a discrete event system module 504, and a fault notification module 506. The Built-in-Test module 502 performs a plurality of Built-in-Tests. As described above, each Built-in-Test verifies that a component of the electronic system is functioning properly. The Built-in-Test module 502 passes each negative test result to the discrete event system module 504 in the form of an event indicator and temporal data describing the time when the event indicator was generated.

The discrete event system module 504 implements a discrete event system to detect fault states for the electronic system based on the timing and sequencing of the event indicators that it receives from the Built-in-Test module 502. In general, a discrete event system is a dynamic system whose behavior is governed by the occurrence of events that cause changes to the state of the system. In this case, one or more temporal combinations identified during method 300 provide the model for the states and transitions of the discrete event system. The discrete event system describes the qualitative behavior of the electronic system, including both normal and abnormal behavior.

In one embodiment, the discrete event system module 504 implements a state machine to model the behavior of the electronic system. In general, a state machine has a finite number of states and transitions. Each state provides information about the event indicators that have been received from the Built-in-Test module 502. Each transition defines a condition that must occur for the state machine to move to a specific state. In one embodiment, the state machine is in a "normal" state when the electronic system is initialized. If the discrete event system module 504 receives event indicator A from the Built-in-Test module 502, the state machine transitions to a "potential capacitor fault 1" state. If the discrete event system module 504 receives event indicator D while the state machine is in a "potential capacitor fault 1" state, the state machine transitions to a "potential capacitor fault 2" state. On the other hand, if the discrete event system module 504 receives event indicators C while the state machine is in the "potential capacitor fault 1" state, the state machine transitions back to the "normal" state. For all other event indicators, the state machine remains in the "potential capacitor fault 1" state. If the electronic system generates event indicator C while the state machine is in a "potential capacitor fault 2" state then the electronic system has generated sequence of event indicators A, D, and C that are indicative of a capacitor failure and the state machine transitions to a "capacitor fault" state. On the other hand, if the discrete event modeling system generates an A or D while the state machine is in a "potential capacitor fault 2" state, the state machine transitions back to a "potential fault capacitor 1" state, in the case of event indicator A, or a "normal" state in the case of event indicator D.

In another example, the discrete event system module 504 receives event indicator N from the Built-in-Test module 502 at any time the state machine transitions to a "potential resistor fault 1" state. If the state machine is in the "potential resistor fault 1" state and the discrete event system module 504 receives event indicator U within one minute of the time when it entered "potential resistor fault 1" state then it transitions to a "potential resistor fault 2" state. However, if the discrete event system module 504 receives a different event indicator (other than N) while the state machine is in the "potential resistor fault 1" state or if the state machine remains in the "potential resistor fault 1" state for more than one minute, it transitions back to the "normal" state. If the state machine is in the "potential resistor fault 2" state and the discrete event system module 504 receives event indicator X, then the state machine transitions to a "resistor fault" state. However, if the state machine is in the "potential resistor fault 2" state and the discrete event system module 504 receives a different event indicator (other than N) or if more than one minute has passed since the state machine transitioned into the "potential resistor fault 1" state, the state machine returns to the "normal" state.

When the state machine is in a fault state (e.g., "capacitor fault" or "resistor fault") as described above, the discrete event system module 504 transmits an indication of a fault to the fault notification module 506. The fault notification module 506 then generates a notification that alerts the operators or maintenance personnel for the electronic system of the potential fault. In addition, in some embodiments additional information from the error code/root cause database 400 may be used to identify the time that a potential fault will occur. For example, as shown in FIG. 5 there is approximately a one week lag time between the generation of event indicator C and the occurrence of an operational issue (e.g. the module removal time 425) for the error codes 424 that correspond to root cause 422 capacitor failure. Thus, maintenance personnel know that they have a time period of approximately one week to schedule the needed maintenance.

While two exemplary embodiments of an implementation of the discrete event system module 504 are provided above, it will be understood by one who is skilled in the art that in other embodiments the discrete event system module 504 may implement state machines that model one or more temporal combinations identified during method 300 alone or concurrently.

In addition, temporal relationships identified during method 300 may be used by maintenance personnel to diagnose the cause of an operational issue for an electronic system. For example, if the maintenance personnel determine that an electronic system has produced the sequence of event indicators A, D, and then C before it was removed from its operational environment, they may decide to check whether the cause of the operational issue is a capacitor failure. Further, if the electronic system generated event indicators T and R and was removed from its operational environment within one month of the first occurrence of either T or R, the maintenance personnel may decide to check whether the cause of the operational issue is a power failure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting temporal relationships that are uniquely associated with a selected root cause, the method comprising:
    storing a plurality of error codes, wherein each error code comprises a plurality of event indicators and temporal data describing when each of the event indicators were generated, and wherein each error code is associated with descriptive data and a module removal time;
    storing a plurality of root causes, each associated with descriptive data that corresponds to the descriptive data of the plurality of error codes;
    identifying error codes from the plurality of error codes that correspond to at least one of the plurality of root causes based on the descriptive data;
    analyzing each of the error codes to detect a combination of event indicators that is associated with error codes corresponding to the selected root cause and to a non-selected root cause; and
    detecting a temporal relationship involving the combination of event indicators, wherein the temporal relationship is uniquely associated with error codes corresponding to the selected root cause.

2. The method of claim 1, wherein the step of storing the plurality of error codes further comprises:
    storing a plurality of error codes, wherein each error code comprises a plurality of event indicators and a timestamp describing the time when each event indicator was generated.

3. The method of claim 1, wherein the step of analyzing further comprises:
    identifying the error codes associated with the selected root cause;
    analyzing each of the identified error codes to detect at least one combination of event indicators associated with the selected root cause; and
    analyzing each of the remaining error codes to determine whether they are associated with the combination of event indicators.

4. The method of claim 1, wherein the step of detecting further comprises:
    detecting a temporal relationship involving the combination of event indicators, wherein the temporal relationship is associated with the error codes corresponding to the selected root cause;
    determining if the temporal relationship applies to an error code that corresponds to a non-selected root cause; and
    associating the temporal relationship with the selected root cause if the temporal relationship is not associated with an error code that corresponds to a non-selected root cause.

5. The method of claim 4, wherein the step of analyzing the error codes for the selected root cause further comprises:
    analyzing the error codes for the selected root cause to detect a temporal relationship that is associated with those error codes, wherein the temporal relationship comprises a sequence of at least two of the event indicators from the combination of event indicators.

6. The method of claim 4, wherein the step of analyzing the error codes for the selected root cause further comprises:
    analyzing the error codes for the selected root cause to detect a temporal relationship that is associated with those error codes, wherein the temporal relationship comprises a sequence of at least two of the event indicators from the combination of event indicators that is generated within a set time period.

7. The method of claim 4, wherein the step of analyzing the error codes for the selected root cause further comprises:
    analyzing the error codes for the selected root cause to detect a temporal relationship that is associated with those error codes, wherein the temporal relationship comprises a set time period between the module removal time and one of the event indicators in the combination.

8. The method of claim 4, wherein the step of analyzing the error codes for the selected root cause further comprises:
    analyzing the error codes for the selected root cause to detect a temporal relationship that is associated with those error codes, wherein the temporal relationship comprises a sequence of at least two of the event indicators from the combination of event indicators that is repeated a set number of times.

9. A method for detecting temporal relationships involving Built-in-Test results associated with a selected root cause, the Built-in-Test results generated by an electronic system configured to perform Built-in-Tests, the method comprising:
    storing a plurality of Built-in-Test error codes, wherein each Built-in-Test error code comprises a plurality of Built-in-Test results and temporal data describing when each of the Built-in-Test results were generated, and wherein each Built-in-Test error code is associated with descriptive data and a module removal time;
    storing a plurality of root causes, each associated with descriptive data that corresponds to the descriptive data of the plurality of error codes;
    identifying Built-in-Test error codes from the plurality of Built-in-Test error codes that correspond to at least one of the plurality of root causes based on the descriptive data
    analyzing each of the Built-in-Test error codes to detect a combination of Built-in-Test results that is associated with Built-in-Test error codes corresponding to the selected root cause and to a non-selected root cause; and detecting a temporal relationship involving the combination of Built-in-Test results, wherein the temporal relationship is uniquely associated with Built-in-Test error codes corresponding to the selected root cause.

10. The method of claim 9, wherein the step of detecting further comprises:

detecting a temporal relationship involving the combination of Built-in-Test results that is associated with the Built-in-Test error codes that correspond to the selected root cause;

determining if the temporal relationship applies to Built-in-Test error codes for the remaining root causes; and associating the temporal relationship with the selected root cause if the temporal relationship is not associated with the Built-in-Test error codes for the remaining root causes.

11. The method of claim 10, wherein the step of analyzing the Built-in-Test error codes for the selected root cause further comprises:

analyzing the Built-in-Test error codes for the selected root cause to detect a temporal relationship that is associated with those Built-in-Test error codes, wherein the temporal relationship comprises a sequence of at least two of the Built-in-Test results from the combination of Built-in-Test results.

12. The method of claim 10, wherein the step of analyzing the Built-in-Test error codes for the selected root cause further comprises:

analyzing the Built-in-Test error codes for the selected root cause to detect a temporal relationship that is associated with those Built-in-Test error codes, wherein the temporal relationship comprises a sequence of at least two of the Built-in-Test results from the combination of Built-in-Test results that is generated within a set time period.

13. The method of claim 10, wherein the step of analyzing the Built-in-Test error codes for the selected root cause further comprises:

analyzing the Built-in-Test error codes for the selected root cause to detect a temporal relationship that is associated with those Built-in-Test error codes, wherein the temporal relationship comprises a set time period between the module removal time for a Built-in-Test error code and one of the Built-in-Test results in the combination.

14. The method of claim 10, wherein the step of analyzing the Built-in-Test error codes for the selected root cause further comprises:

analyzing the Built-in-Test error codes for the selected root cause to detect a temporal relationship that is associated with those Built-in-Test error codes, wherein the temporal relationship comprises a sequence of at least two of the Built-in-Test results from the combination of Built-in-Test results, the sequence repeating at least a fixed number of times.

15. The method of claim 9, wherein the temporal relationship is combined with a discrete modeling system to detect a potential operational issue with the electronic system.

16. A system for detecting temporal relationships associated with a selected root cause, the system comprising:

an error code database comprising a plurality of error codes, each error code comprising at least one event indicator, temporal data describing when the event indicator was generated, descriptive data associated with the error code, and a module removal time associated with the error code;

a root cause database comprising a plurality of root causes, each associated with descriptive data that corresponds to the descriptive data of the plurality of error codes; and a processor coupled to the error code database and the root cause database, the processor configured to:

identify error codes from the error code database that correspond to at least one of the plurality of root causes from the root cause database;

detect a combination of event indicators that is associated with error codes corresponding to the selected root cause and to a non-selected root cause; and detect a temporal relationship involving the combination of event indicators, wherein the temporal relationship is uniquely associated with error codes corresponding to the selected root cause.

17. The system of claim 16, wherein the processor is further configured to:

detect a temporal relationship involving the combination of event indicators that is associated with the error codes that correspond to the selected root cause;

determine if the temporal relationship applies to error codes for the remaining root causes; and associate the temporal relationship with the selected root cause if the temporal relationship is not associated with the error codes for the remaining root causes.

18. The system of claim 17, wherein the processor is further configured to:

detect a temporal relationship involving the combination of event indicators that is associated with the error codes that correspond to a selected root cause, wherein the temporal relationship comprises a sequence of at least two of the event indicators from the combination.

* * * * *